July 14, 1970    R. SHARP ET AL    3,520,174
GAUGING DISTANCE BETWEEN TWO SURFACES
Filed Dec. 1, 1967    5 Sheets-Sheet 1

United States Patent Office 3,520,174
Patented July 14, 1970

3,520,174
GAUGING DISTANCE BETWEEN TWO SURFACES
Royds Sharp, Busby, Glasgow, and Malcolm Bath, Philip Smith, James Shelley Rafferty, and Alastair Inglis, East Kilbride, Scotland, assignors to National Research Development Corporation, London, England, a corporation of Great Britain
Filed Dec. 1, 1967, Ser. No. 687,231
Int. Cl. G01b 13/12
U.S. Cl. 73—37.8                   15 Claims

ABSTRACT OF THE DISCLOSURE

Method and apparatus for measuring the chord distance between similar points on similar flanks of two teeth of a gear wheel using two pneumatic proximity gauges mounted a fixed distance apart for movement into and out of the valleys between the teeth. The difference between the signals derived from the two gauges is gained and a sample and hold circuit samples the difference and records the difference as an indication of the discrepancy between the actual and the intended chord distance.

---

This invention relates to the gauging of distance between two surfaces.

According to one aspect of the invention there is provided a method of indicating and/or measuring the distance between two surfaces in which two respective proximity gauge devices are mounted close to the respective surfaces, each gauge device comprising a conduit through which fluid is directed on to or withdrawn from the respective surface and means for producing an output signal representative of a pressure in the conduit and of the distance between the conduit and the surface adjacent the conduit, the said method including combining the output signals of the gauge devices to produce a signal which is representative of the difference between said output signals and of a discrepancy between the distance between said surfaces and the intended distance between said surfaces represented by the distance between the gauge devices.

In another aspect, the invention provides apparatus for indicating and/or measuring the distance between two surfaces comprising two proximity gauge devices each of which has a respective conduit through which fluid is directed on to or withdrawn from the reseptive surface and each of which has means for producing an output signal representative of a presesure in the conduit and of the distance between the conduit and the surface adjacent the conduit, and comparator means for combining the respective output signals of the gauge devices to produce a signal which is representative of the difference between said output signals and of a discrepancy between the distance between said surfaces and the intended distance between said surfaces represented by the distance between the gauge devices.

Each proximity gauge may be adapted to produce a respective fluid pressure output signal and the comparator means may comprise a fluid jet element having two oppositely disposed input channels to which the respective fluid pressure output signals may be applied. Thus the fluid jet element may be bistable, changeover of said element from one stable condition to the other occurring at a predetermined magnitude of the difference between said fluid pressure output signals.

Alternatively, the fluid pressure output signals from the proximity gauge devices may both be applied to a differential pressure transducer which provides an electrical output signal related to the difference in pressure of the two fluid pressure signals applied to it.

Alternatively, each proximity gauge device may be adapted to produce a respective electrical output signal and the comparator means may comprise a differential amplifier, the resultant output signal of which is an electrical signal dependent of the magnitude of the difference between said electrical output signals of the proximity gauge devices.

A signal level detector is preferably connected to or associated with one of said proximity gauge devices for producing a level signal representative of the instantaneous magnitude of the output signal of said proximity gauge device, a predetermined magnitude of said level signal being utilised to energise a sampling channel for sampling and indicating the value of the resultant signal from the comparator means.

Said predetermined magnitude of the level signal may also be utilised to move each proximity gauge device away from the respective surface. This feature is particularly useful when said two surfaces are corresponding surfaces of two gear teeth of a gear wheel which is continuously rotating.

The invention will be described, merely by way of example, with reference to the accompanying drawings, in which.

Figure 1:
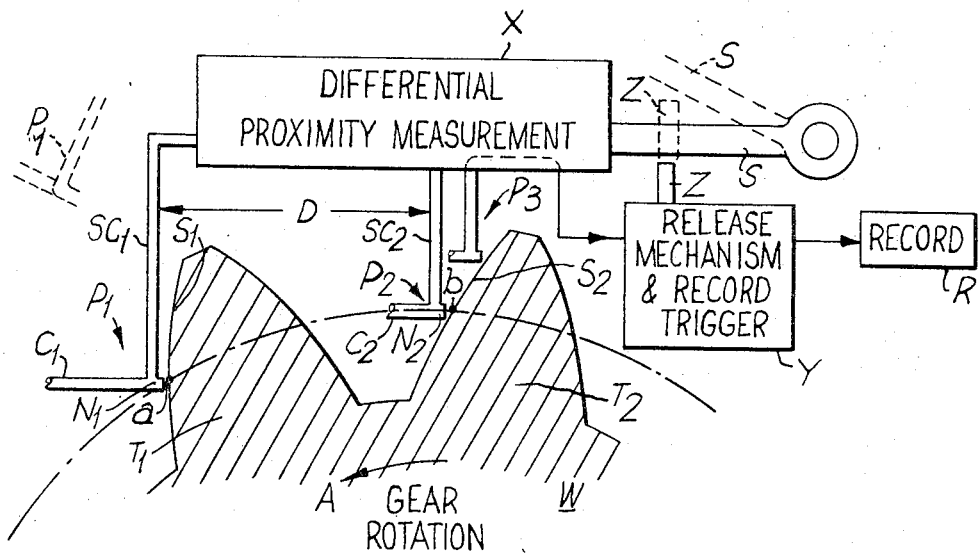
FIG. 1 illustrates diagrammatically an application of one embodiment of the invention.

Apparatus according to one embodiment of the invention for gauging the distance between corresponding surfaces of two gear teeth is illustrated, purely diagrammatically, in FIG. 1. Two proximity gauge devices $P_1$, $P_2$ are mounted on a support S at a fixed distance D apart corresponding to a predetermined gear pitch, or integral number of gear pitches.

The support S has an operative position, as illustrated in FIG. 1, in which the respective proximity gauges $P_1$, $P_2$ are disposed at adjacent point $a$, $b$ on corresponding surfaces $S_1$, $S_2$ of adjacent gear teeth $T_1$, $T_2$ of a rotating gear wheel W, the direction of rotation being indicated by arrow A.

Each of the proximity gauges $P_1$, $P_2$ comprises a respective conduit $C_1$, $C_2$ terminating in a respective nozzle $N_1$, $N_2$, facing in the opposite direction to the direction of rotation A of the gear wheel W, through which fluid under pressure, in this case compressed air, is directed on to the respective surfaces $S_1$, $S_2$ at points $a$, $b$, respectively. Each gauge $P_1$, $P_2$ could alternatively, be arranged so that fluid (e.g., air) is withdrawn through the respective conduits $C_1$, $C_2$. The respective proximity gauges $P_1$, $P_2$ are adapted to produce respective output signals representative of the instantaneous distance between the respective nozzle $N_1$, $N_2$ and the respective surfaces $S_1$, $S_2$. In the embodiment of FIG. 1, this output signal is a fluid pressure signal and is fluid pressure in a respective conduit $SC_1$, $SC_2$. The conduits $SC_1$, $SC_2$ are in communication with the conduits $C_1$, $C_2$ respectively close adjacent the nozzles $N_1$, $N_2$ respectively. Each of these pressures will be dependent on the effective restriction to fluid flow presented by the distance between the respective nozzle $N_1$, $N_2$ and the respective surfaces $S_1$, $S_2$.

Figure 2:
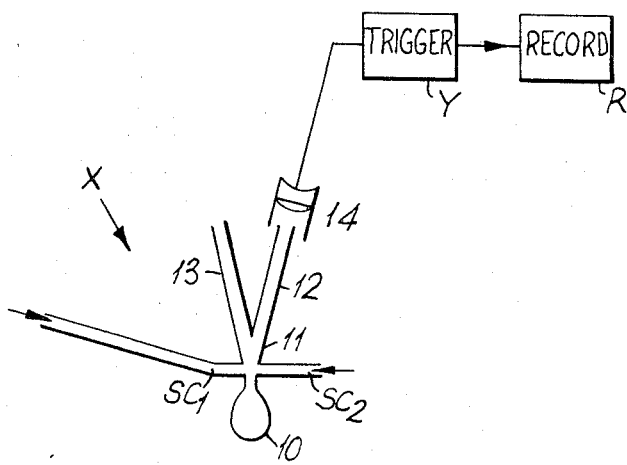
FIG. 2 is a diagrammatic illustration of comparator means forming part of apparatus according to one embodiment of the invention.

The respective fluid pressure output signals of the respective proximity gauges $P_1$, $P_2$ are compared in a comparator device X, which is shown diagrammatically in FIG. 2.

The comparator device of FIG. 2 comprises a fluid jet element X or "fluid logic device" of the bistable type, that is, effectively a fluid jet flip-flop device. Basically, the fluid jet element comprises a source of fluid under pressure (compressed air) 10 which directs a fluid jet into a space 11. The space 11 divides into two symmetrically disposed branch ducts 12, 13. In this case, the fluid jet element is provided with two control inputs, comprising the fluid pressures in the respective signal conduits $SC_1$, $SC_2$ which communicate with opposite sides of the space 11. Thus the fluid jet passing through the space 11 will be deflected into the branch duct 12 or the branch duct 13 according to which of the fluid pressures in the conduits $SC_1$, $SC_2$ respectively is the greater. The condition in which the fluid jet passes through the branch duct 12 represents one stable state of the element, while the condition in which the fluid jet passes through the branch duct 13 represents the other stable state of the element. A pressure transducer 14, such as an electrical transducer, may be placed in the branch duct 12 to indicate changes in the fluid pressure therein, which is dependent on the fluid flow through the respective branch duct 12. The transducer 14 will therefore indicate when the fluid jet element X is changed from one stable state to the other, that is, when the difference between the fluid pressures applied through conduits $SC_1$, $SC_2$ has a predetermined value. This predetermined value may correspond to a predetermined error in the gear pitch.

The output of the transducer 14 is recorded by a recording device R. The recording device R is energised to record the signal from the transducer 14 by a trigger device Y which is triggered into operation by a predetermined magnitude of the output pressure from one of the proximity gauges $P_1$, $P_2$ or from a separate proximity gauge $P_3$ mounted adjacent one of the surfaces $S_1$, $S_2$ as illustrated in FIG. 1. In addition to rendering the recording device R operable to record the output from the transducer 14, the trigger device Y also operates a release mechanism which moves the proximity gauges $P_1$, $P_2$, $P_3$ out of the path of the gear teeth $T_1$, $T_2$. In the arrangement illustrated diagrammatically in FIG. 1, the release mechanism comprises a movable plunger Z which is moved into the position shown in broken lines on operation of the trigger device Y to move the support S and associated proximity gauges $P_1$, $P_2$, $P_3$ into the position corresponding to the broken line positions of gauge $P_1$ and support $S_1$.

The sequence of measurement for each successive pair of gear teeth $T_1$, $T_2$ is thus carried out automatically by the arrangement described above. When the respective surfaces $S_1$, $S_2$ are within a predetermined distance of the proximity gauges $P_1$, $P_2$ as indicated, as for example, by the signal from the proximity gauge $P_3$, the trigger device is triggered, and causes the recording device R to record the instantaneous value of the output signal from the transducer 14. This provides an indication of the distance between points $a$ and $b$ of the surfaces $S_1$, $S_2$ as compared with the predetermined distance D between the proximity gauges $P_1$, $P_2$, that is, of the error in the pitch of the gear teeth. At the same time the proximity gauges $P_1$, $P_2$ and the proximity gauge $P_3$ if provided, are moved out of the path of the gear teeth $T_1$, $T_2$. A delay device (not shown) may be incorporated in the trigger device Y to return the support S to the operative position shown in FIG. 1 after a predetermined delay, sufficient for teeth $T_1$, $T_2$ to pass beneath the respective proximity gauges $P_1$, $P_2$, $P_3$.

Figure 3:
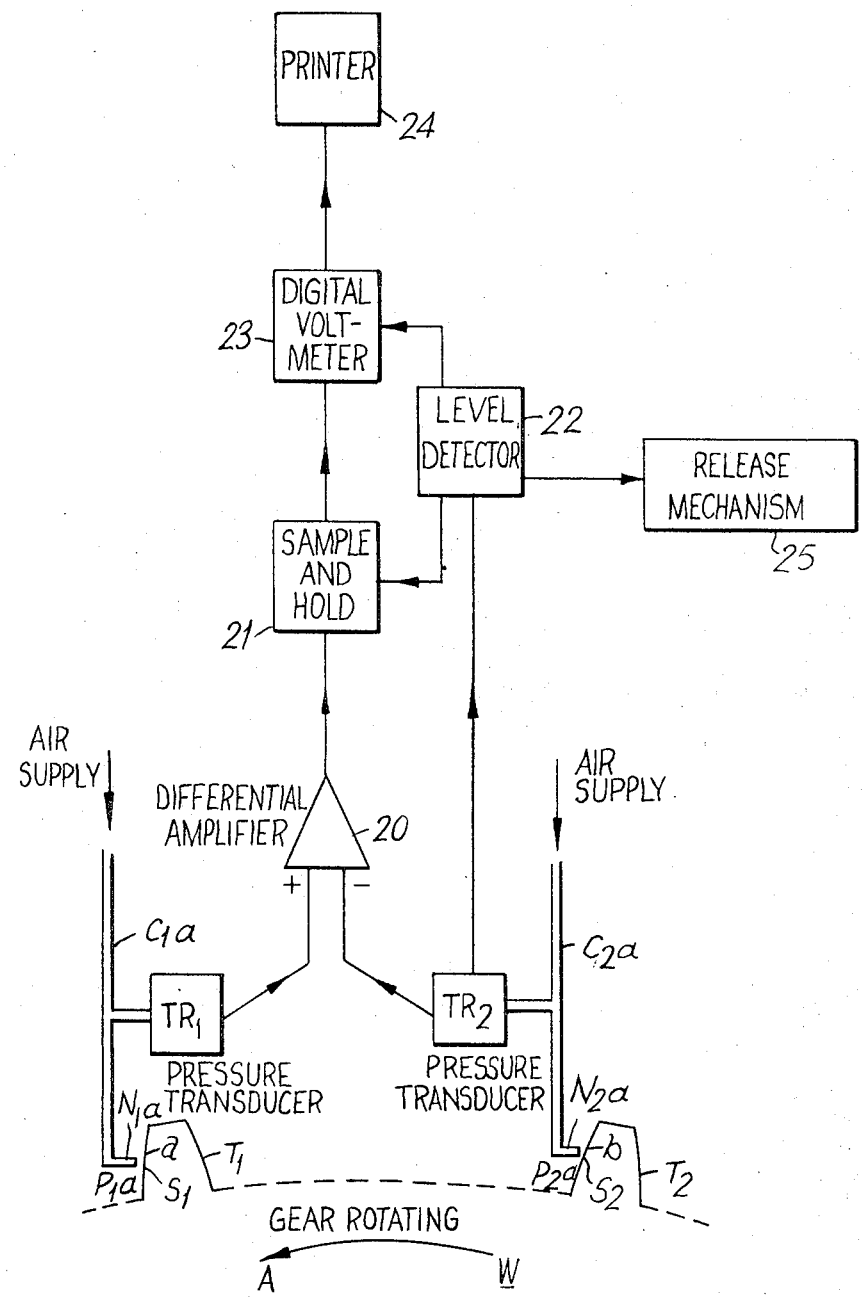
FIG. 3 illustrates diagrammatically a second embodiment of the invention.

A second embodiment of the invention is illustrated diagrammatically in FIG. 3. The principle of measurement is essentially the same as that of FIG. 1 and parts in the embodiment illustrated in FIG. 3 similar to parts in the embodiment illustrated in FIG. 1 are given the same reference letter or numeral with the addition of the suffix "$a$." In the embodiment illustrated in FIG. 3, the proximity gauges $P_1a$, $P_2a$ are associated with respective electrical pressure transducers $TR_1$, $TR_2$ which are responsive to the pressures in the respective conduits $C_1a$, $C_2a$ at points therein close to the nozzles $N_1a$, $N_2a$. Each proximity gauge $P_1a$, $P_2a$ may, for example, be of the form described in copending application No. 40,239/66.

The respective pressure transducers $TR_1$, $TR_2$ produce respective electrical output signals representative of the pressures at said points in the respective conduits $C_1a$, $C_2a$ and representative, therefore, of the distance between said nozzles $N_1a$, $N_2a$ and the respective surfaces $S_1$, $S_2$ of the respective gear teeth $T_1$, $T_2$. These electrical output signals are compared in a differential amplifier 20, the output of which is an electrical signal which is dependent on the magnitude of the difference between the electrical output signals from the respective pressure transducers $TR_1$, $TR_2$. The output from the differential amplifier 20 is passed to a sampling and holding circuit 21.

The output of one of the pressure transducers, $TR_2$, is passed to a level detector circuit 22 which, in response to a predetermined magnitude of the electrical signal from said transducer $TR_2$, corresponding to a predetermined distance between the nozzle $N_2a$ and the surface $S_2$, energises the sampling and holding circuit 21 and a digital voltmeter 23. The digital voltmeter 23 then reads the instantaneous value of the difference between the output signals from the respective pressure transducers $TR_1$, $TR_2$, as represented by the output of the differential amplifier 20. This reading may be recorded by a suitable print-out device 24.

As in the embodiment of FIG. 1, the readings of the digital voltmeter 23 represent the difference between the respective distances between nozzles $N_1a$, $N_2a$ and the surfaces $S_1$, $S_2$, when one of said distances has a predetermined magnitude, as determined by the setting of the level detector circuit 22, thus, the magnitude of this difference will be indicative of the error in the distance between the two points $a$, $b$ on the respective surfaces $S_1$, $S_2$.

The level detector circuit 22 may operate a release mechanism 25 for removing the proximity gauges $P_1a$, $P_2a$ from the path of the gear teeth $T_1$, $T_2$ as in the embodiment of FIG. 1.

It will be appreciated that the two gear teeth $T_1$, $T_2$ need not necessarily be adjacent gear teeth, but, as indicated in FIG. 3, could be any two gear teeth of a rotating gear wheel W.

The air jets issuing from the respective nozzles $N_1$, $N_2$; $N_1a$, $N_2a$ serve to clean any loose dirt particles from the surfaces $S_1$, $S_2$ before gauging is effected.

In practice, a convenient range of values for the diameter of the nozzles $N_1$, $N_2$ is between 0.005 inch and 0.080 inch.

Figure 4:
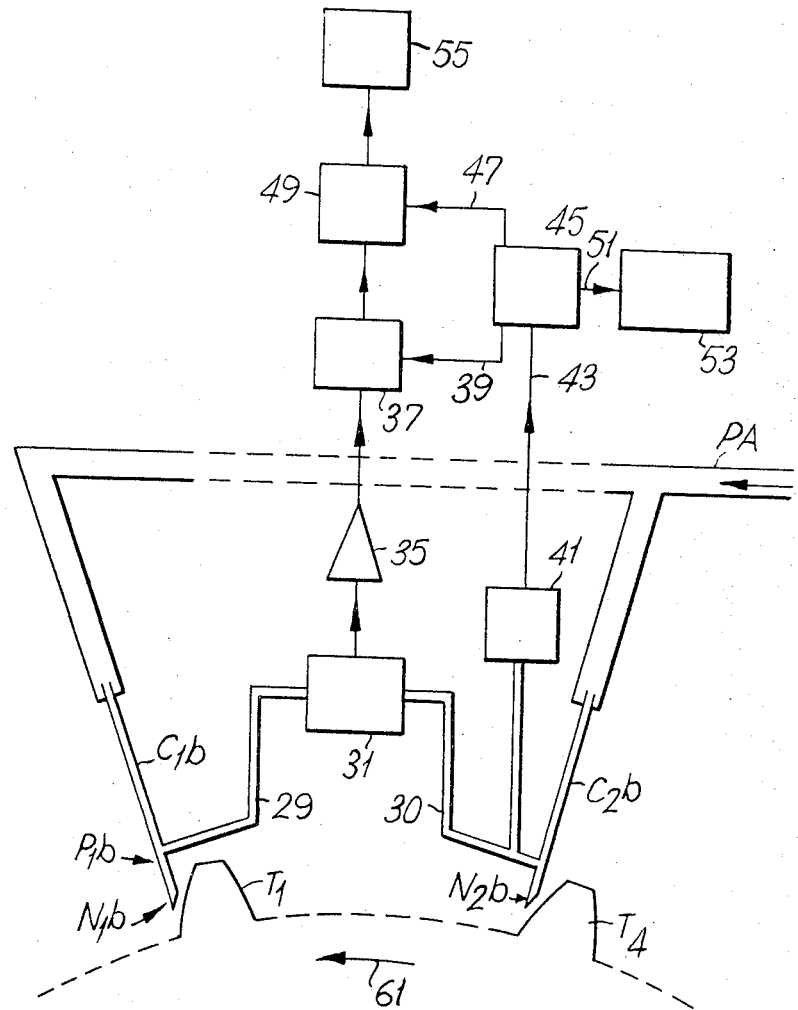
FIG. 4 illustrates diagrammatically a third embodiment of the present invention.

In FIG. 4 there is illustrated a third embodiment of the present invention. Parts in the third embodiment similar to parts in the first or second described embodiments are given the same reference numerals or letters with the addition of the suffix "$b$." FIG. 4 illustrates the embodiment adapted to measure in turn the chord-length distance between each tooth, $T_1$, and a further tooth $T_4$, which is three teeth further on.

Pressure air supplied through a conduit PA is applied to capillary tubes $C_1b$, $C_2b$ from which it discharges through the nozzles $N_1b$, $N_2b$ adjacent the gear teeth $T_1$, $T_4$ in directions normal to the respective adjacent surfaces of the gear wheel teeth. Conduits 29, 30 extend from the capillary tubes $C_1b$, $C_2b$ respectively at points close adjacent their nozzles $N_1b$, $N_2b$, respectively to a differential pressure transducer 31. The pressures in the conduits 29, 30 are dependent upon the distances between the nozzles $N_1b$, $N_2b$ and the teeth $T_1$, $T_4$ and the differential pressure transducer therefore has applied to it, through the conduits 29, 30, pressure signals indicative of these two distances.

The transducer 31 is of a type which provides an electrical output signal proportional over a working range to the difference in the pressure applied respectively to its two inputs. This electrical output is applied to an electronic amplifier 35 which in turn supplies an input too a "sample and hold" circuit 37. This circuit 37 when supplied with a signal through a lead 39 samples the voltage instantaneously on the output from the amplifier 35 and holds that voltage until a further signal on the lead 39 causes it to resample that voltage. The pressure in conduit 30 is also applied to a pressure transducer 41 which provides in lead 43 a signal indicative of the pressure in that conduit. Lead 43 is connected to a "level detector" circuit 45 which has a first stable state and a second stable state and switches from the first state to the second state as the input signal on lead 43 reaches a predetermined level. When this happens, the level detector circuit provides an output signal on lead 39 controlling the "sample and hold" circuit 37, on a lead 47 controlling the activation of a digital voltmeter 49, and on a lead 51 controlling the activation of a release mechanism 53 which is similar to the release mechanism Y with its plunger Z illustrated in, and described with reference to, FIG. 1. The release mechanism raises the two conduits 11 and 21 clear of the teeth of the gear wheel 1. The output from the "sample and hold" circuit 37 is applied to the input of the digital voltmeter 49, and the output of that voltmeter is applied to a print-out mechanism 55.

In use of the apparatus illustrated in and described with reference to FIG. 4, the gear wheel 5 is slowly rotated in the direction indicated by the arrow 61, so that the two teeth $T_1$ and $T_4$ slowly approach the nozzles $N_1b$ and $N_2b$ of the two gauges $P_1b$ and $P_2b$ respectively. Once the clearances between the nozzles and the teeth have become sufficiently small, the restriction of the two discharges will cause pressure to build up in the gauges, these pressures being applied to the differential pressure transducer 31. If the spacings of the two nozzles from the associated teeth are equal, corresponding to the case of perfect tooth spacing, the output from transducer 31 will remain constant. If the spacing is incorrect, the output signal will rise accordingly. When the gear wheel tooth $T_4$ has approached the nozzle $N_2b$ sufficiently closely, the increased pressure in the conduit 30 causes the output from the pressure transducer 41 to rise to a sufficient value to operate the level detector circuit 45, so causing the circuit 37 to sample the voltage output from the amplifier 35, the digital voltmeter 49 to indicate that voltage, and the print-out mechanism 55 to print out a permanent record of the voltage. It will be appreciated that if desired the voltmeter and the print-out mechanism can be arranged to provide outputs directly indicative of linear measurements, rathe rthan voltages which require interpretation. Almost immediately the release mechanism 53 operates to cause gauges $P_1b$, $P_2b$ to be withdrawn from between the teeth of the gear wheel and after a suitable short time delay the gauges are relowered into the valleys between the next pair of teeth, to carry out a measuring operation on a further pair of teeth. An advantage of the use of proximity gauges is that the measuring device does not need to contact the gear teeth, and that the measurement is made not on a point but as an average over a small area, thus minimising the effect of surface defects.

Figure 5:
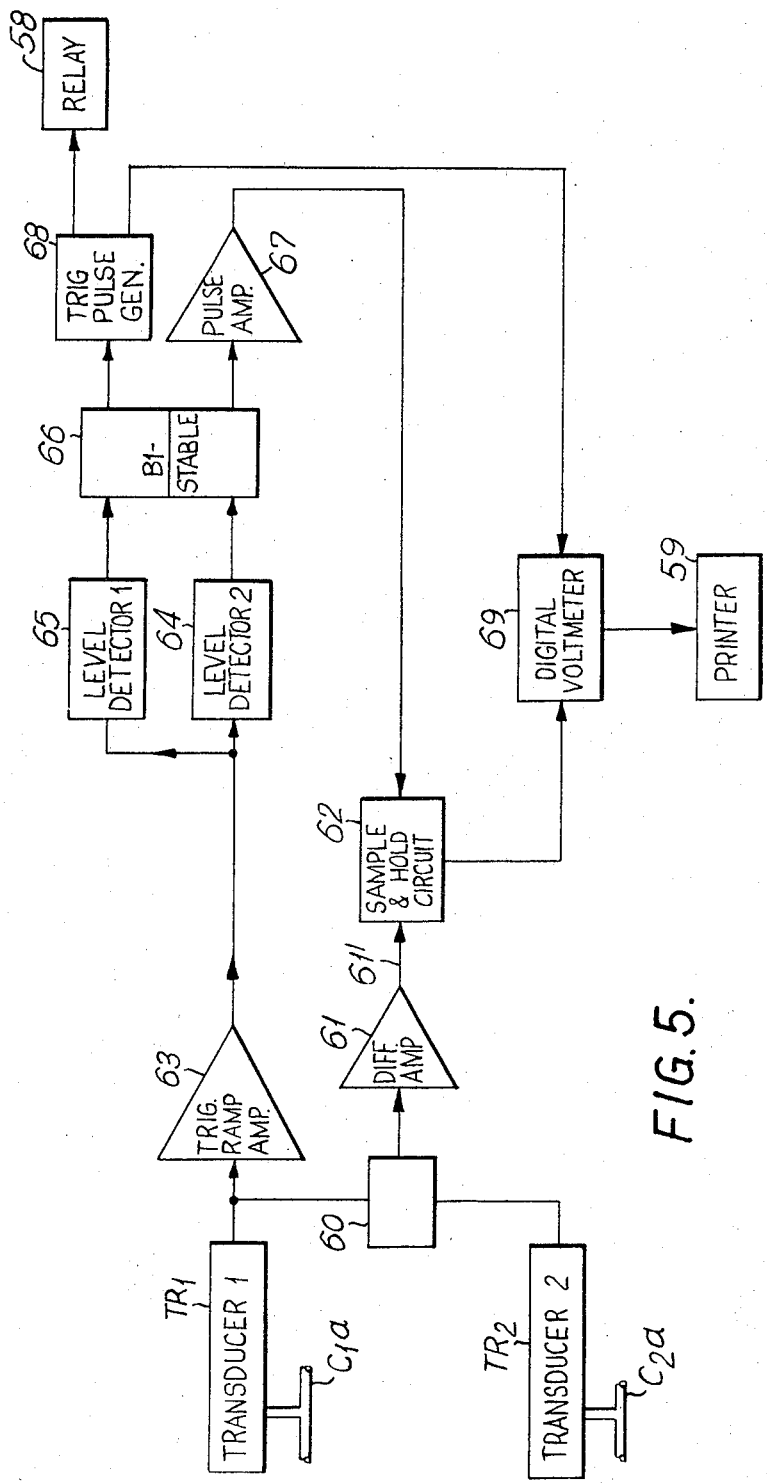
FIG. 5 illustrates diagrammatically an electrical circuit which is an alternative to that illustrated in FIG. 3; and, FIG. 6 is a circuit diagram of a capacitative store included in the circuit illustrated in FIG. 5.

FIG. 5 illustrates an electrical circuit alternative to that illustrated in FIG. 3.

The respective outputs of two transducers $TR_1$ and $TR_2$ associated respectively with gauge $P_1a$ and gauge $P_2a$ are fed to a difference unit 60 the output of which is a voltage representing the difference between the two signals. This difference signal is amplified in an amplifier 61 and passed thence to a sample and hold circuit 62 the function of which will be described.

The output of transducer $TR_1$ alone is also amplified in an amplifier 63 the output of which is fed to two level detectors 64 and 65 which respectively set and reset a bistable circuit 66. When bistable circuit 66 is in the set condition, a control signal is applied to sample and hold circuit 62 through a pulse amplifier 67. The resetting of bistable circuti 66 operates a trigger pulse generator 68 which triggers the read-out of a digital voltmeter 69 to a printer 59 and in addition energises relay 158 which causes the support 5 to be rocked about its pivot so that the gauges are moved out of the path of the gear teeth.

The electronic circuit of FIG. 5 is, like the circuit of FIG. 4, designed to cause measurement of the variations in positions of the relevant gear tooth flanks relative to the gauges at periods of time determined by the position of one gear tooth flank relative to the adjacent gauge. The determination of the periods of time at which measurement takes place is achieved by taking the output of amplifier 63, which is a D.C. voltage increasing with time, and represents the instantaneous position of the flank of a gear tooth, as determined by gauge $P_1b$ and applying it to the two level detectors 64 and 65. Level detector 64 provides an output signal when the input voltage reaches a particular level corresponding to a particular position of a gear tooth flank. The output from level detector 64 determines the commencement of a time period of measurement and sets bistable circuit 66 so as to cause operation of the sample and hold circuit 62 to measure the output of difference amplifier 61 in a manner to be described. As the gear wheel continues to rotate the magnitude of the voltage output from amplifier 63 increases until eventually it reaches a level sufficient to trigger level detector 65. The output of level detector 65 determines the end of a time period of measurement and resets bistable circuit 66 to stop the operation of sample and hold circuit 62 and at the same instant triggers digital voltmeter 69 to read out the voltage standing at that instant in circuit 62. It will thus be seen that measurement is commenced when a gear tooth flank has reached a predetermined position relative to gauge $P_1b$ and continues for a time corresponding to the movement of the tooth by a predetermined distance.

Figure 6:
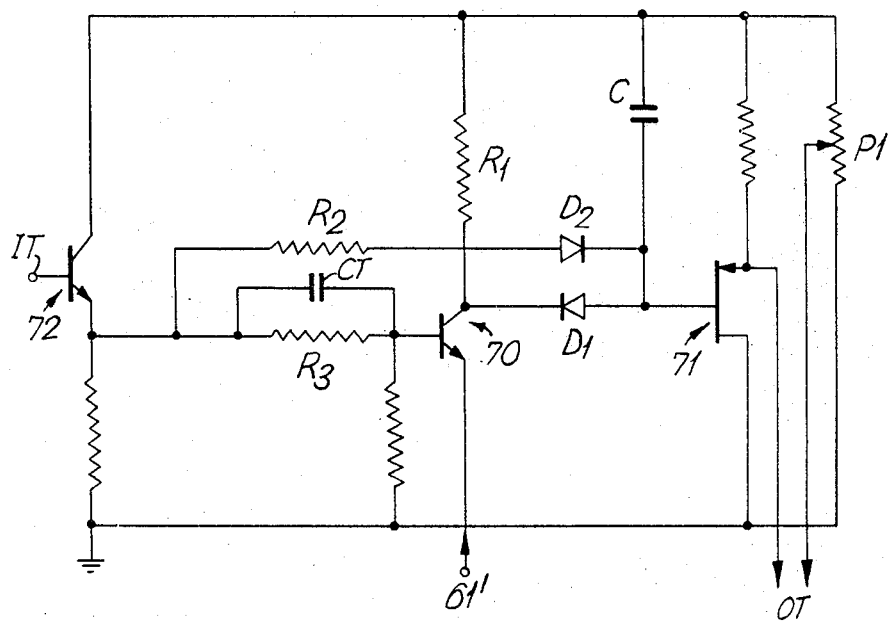

Sample and hold circuit 62 is shown in greater detail in FIG. 6. This circuit comprises a transistor 70 having a collector load resistor $R_1$ across which is connected a capacitor C in series with a diode $D_1$. The junction between capacitor C and diode $D_1$ is connected through a diode $D_2$ and a resistor $R_2$ to the output of an emitter follower stage comprising a transistor $T_3$. The output of pulse amplifier 67 (FIG. 5) is applied to input terminal IT of the circuit. The output of the emitter follower stage is applied to the base of transistor 70 through a resistor $R_3$ paralleled by a capacitor $C_1$. The junction between capacitor C and the diodes $D_1$ and $D_2$ is connected to the base of a field-effect transistor 71 connected as a common source amplifier. The output of the circuit is then taken from the source of transistor 71 to one of a pair of output terminals OT connected to the digital voltmeter 69. The other output terminal is connected to a potentiometer $P_1$ which enables the reading of the digital voltmeter 69 to be referred to any given datum. The voltage to be measured is applied at input terminal 61' connected to the emitter of transistor 70.

In the quiescent state of the circuit in the absence of a sampling pulse at terminal IT transistor 70 is cut off due to the fact that its base is effectively earthed. The arrival of a sampling pulse caused by the setting of bistable circuit 20 raises the potential of input terminal IT sufficiently to saturate transistor 72 and hence transistor 70. Accordingly, the collector of transistor 70 takes on a potential of V volts, where V is the voltage input at terminal 61' obtained from difference amplifier 61. The voltage across the collector load resistor $R_1$ of transistor 70 is $V_1-V$, where $V_1$ is the supply voltage. Both diodes $D_1$ and $D_2$ now conduct. If the voltage across capacitor C is less than $V_1-V$, capacitor C will charge towards this value through conducting diode $D_1$. Should the potential of capacitor C be greater than $V_1-V$, then it should be noted that a discharge path is set up through diode $D_2$ and resistor $R_2$ since the emitter of emitter follower transistor 72 is substantially at the potential of $V_1$ in its saturated state. In either case capacitor C will approach exponentially towards the voltage $V_1-V$ during the time that a sampling pulse is applied.

When the sampling pulse terminates, transistors 72 and 70 cut off so that resistor $R_2$ is returned to a potential which is substantial earth potential. Accordingly, reverse potentials are applied across diodes $D_1$ and $D_2$ and no charge or discharge path exists for the charge on capacitor C. Thus, the potential of capacitor C remains constant between sampling pulses apart from any leakage.

The potential of capacitor C is fed to field-effect transistor 71 and thence to the output terminals of the sample and hold circuit whence it is applied to the digital voltmeter at the end of each sampling period. By choosing low leakage characteristic diodes for diodes $D_1$ and $D_2$ and having the output stage of the sample and hold circuit as a common source field-effect transistor which has as one of its properties a high input impedance, the leakage of charging from capacitor C in the period between samples is kept very low.

It will be noted that since the duration of the sampling pulse is not constant, but is inversely proportional to the speed of passage of the flanks of the gear wheel, the duration of the charge or discharge of the capacitor C in the sample and hold circuit is similarly inversely proportional to speed. This allows compensation of the fact that the difference signal itself is not in practice a constant quantity but is dependent on the speed of rotation of the gear wheel. By compensating for this effect reproducible results are obtained which are independent of gear wheel speed.

Whilst the circuit of FIGS. 5 and 6 has been described as an alternative to that of FIG. 3, it is to be understood that a modification of it could be used as an alternative to the circuit of FIG. 4. In such an arrangement the difference unit 60 would be omitted and the transducer 31 would feed to the amplifier 61. The transducer 41 would feed to the amplifier 63.

We claim:
1. A method of indicating and/or measuring the distance between two surfaces, comprising:
   providing two proximity gauge devices;
      each of said gauge devices comprising: a conduit having an outlet; and means adapted to produce a signal representative of a pressure in the conduit;
   mounting said proximity gauge devices at a predetermined distance apart with the outlets of the conduits thereof directed towards respective ones of said two surfaces;
   causing relative movement of said devices along like collision courses with the respective ones of said two surfaces;
   directing fluid flow so as to create a fluid pressure differential between said first surface and said first conduit and said second surface and said second conduit so that each of said means adapted to produce provides a signal representative of the distance between the outlet of the associated conduit and the adjacent surface;
   combining said signals whereby a signal is produced representative of the difference between said signals and hence of a discrepancy between the distance between said surfaces and the intended distance between said surfaces represented by said predetermined distance between said proximity gauge devices, and
   withdrawing said devices from said collision course when one of said devices is at a pretermined spacing from its respective surface.

2. Apparatus for indicating and/or measuring the distance between two surfaces, comprising:
   two proximity gauge devices mounted in predetermined spaced relationship, each having:
   a conduit for directing fluid flow so as to create a pressure differential between the conduit and a respective one of said surfaces; and
   means for moving said two surfaces toward said two gauges respectively;
   means adapted to produce an output signal representative of a pressure in each said conduit and of the distance between each said conduit and said surface;
   comparator means adapted to combine said output signals of the proximity gauges to produce a signal representative of the difference between said output signals and of a discrepancy between the distance between said surfaces and the intended difference between said surfaces represented by the predetermined distance between said proximity gauge devices.

3. Apparatus as claimed in claim 2, wherein:
   said two surfaces are flank surfaces of two teeth of a rotating gear wheel; and said apparatus includes:
      means for moving said proximity gauge devices into and out of positions in the valleys between respective pairs of teeth of said gear wheel, said positions being at a predetermined radial distance from the axis of said gear wheel.

4. Apparatus as claimed in claim 3, wherein:
   said means adapted to move said proximity gauge devices includes:
      a detector adapted to monitor the output signal associated with one of said proximity gauge devices;
      said detector being adapted to initiate withdrawal of said proximity gauge devices from said valleys when said one of said proximity gauge devices and the surface being sensed by said one device reaches a predetermined value as the gearwheel is rotated relative to said proximity gauge device.

5. Apparatus as claimed in claim 2, wherein:
   said means adapted to produce an output signal is adapted to produce a fluid pressure output signal.

6. Apparatus as claimed in claim 5, wherein said comparator means comprises:
   a bistable fluid jet element having oppositely directed input channels adapted to receive said fluid pressure signals; and
   means are provided which are adapted to indicate when said bistable fluid jet element is in one of its stable conditions.

7. Apparatus as claimed in claim 6, including:
   means adapted to record when said bistable fluid jet element is in said one of its stable conditions.

8. Apparatus as claimed in claim 5, including:
   a differential pressure transducer adapted to receive said fluid pressure signals and to provide an electrical output signal related to the difference between the fluid pressure signals received by it.

9. Apparatus as claimed in claim 8, including:
   means adapted to receive and record said electrical output signal.

10. Apparatus for indicating and/or measuring the distance between two surfaces, comprising:
   two proximity gauge devices mounted in predetermined spaced relationship, each having:
   a conduit for directing fluid flow so as to create a pressure differential between the conduit and a respective one of said surfaces; and
   means adapted to produce a fluid pressure output signal representative of a pressure in each said conduit and of the distance between each said conduit and said surface;
   comparator means adapted to combine said output signals of the proximity gauges to produce a signal representative of the difference between said output signals and of a discrepancy between the distance between said surfaces and the intended difference between said surfaces represented by the predetermined distance between said proximity gauge devices;

a differential pressure transducer adapted to receive said fluid pressure signals and to provide an electrical output signal related to the difference between the fluid pressure signals received by it;

a sample and hold circuit adapted to receive said electrical output signal and having an output, and means adapted to provide a visual indication of the said discrepancy;

said output of said sample and hold circuit being connected to said means adapted to provide a visual indication.

11. Apparatus for indicating and/or measuring the distance between two surfaces, comprising:

two proximity gauge devices mounted in predetermined spaced relationship, each of which includes:

a conduit adapted to direct fluid flow so as to create a fluid pressure differential between said conduit and a respective one of said surfaces; and means adapted to produce an output signal representative of a pressure in said conduit and of the distance between said conduit and said surface, each of said means adapted to produce an output signal including a pressure transducer adapted to provide an electrical signal related to the pressure in the conduit and to the distance between the conduit and the surface adjacent to the conduit;

comparator means adapted to combine said output signals of the proximity gauge to produce a signal representative of the distance between said output signals and of a discrepancy between the distance between said surfaces and the intended distance between said surfaces representative by the predetermined distance between said proximity gauge devices.

12. Apparatus as claimed in claim 11 including:

a differential amplifier having two inputs:

said pressure transducers being connected to said inputs of said differential amplifier;

said differential amplifier having an output and being adapted to produce at said output an output signal related to the difference between said two electrical signals from said pressure transducers.

13. Apparatus as claimed in claim 12, including:

a sample and hold device having an input and an output;

the input of said sample and hold device being connected to said output of said differential amplifier;

means connected to the output of said sample and hold device adapted to provide an indication of the discrepancy between the distance between said surfaces and the intended distance between said surfaces.

14. Apparatus for indicating and/or measuring the distance between the flank surfaces of the gear teeth of the gear wheel comprising:

two proximity gauge devices mounted in predetermined spaced relationship, each of said proximity gauge devices including:

a conduit adapted to direct fluid flow so as to create a fluid pressure differential between the conduit and a respective one of said surfaces:

means adapted to produce an output signal representative of a pressure in said conduit and of the distance between said conduit and said surface;

means adapted to receive said output signals and to provide an output signal related to the difference between the said two output signals;

a differential amplifier for receiving said output signal related to the difference between the said two output signals;

a sample and hold device adapted to receive the output signal of said differential amplifier;

means adapted to move the proximity gauge devices into and out of the valley between pairs of teeth;

a detector adapted to monitor the output signal of one of said proximity gauge devices and to initiate withdrawal of said proximity gauge devices from said valleys when the distance between said one of said proximity gauge devices and the surface being sensed by the device reaches a predetermined value as the gear wheel is rotated relative to the proximity gauge devices;

said detector also being adapted to initiate the taking of a sample by the sample and hold device when the value of the output signal monitored by the detector attains a predetermined value.

15. A new use for distance measuring apparatus comprising a first conduit, a second conduit, and means for directing fluid flow through said first and second conduits so as to create a first fluid pressure differential between said first conduit and a first surface and a second fluid pressure differential between said second conduit and a second surface the magnitude of said first and second differentials being a function of the separations between said first conduit and said first surface and said second conduit and said second surface respectively, including the steps of:

disposing said conduits and a gear wheel having a plurality of teeth so that first surface is on a first tooth of said wheel and at a given distance from the center of said wheel and said second surface is on a second tooth of said wheel and at said given distance from said center of said wheel;

deriving a first output signal from said first differential;

deriving a second output signal from said second differential;

comparing said first and second signal to determine the pitch circle distance between said first and second surfaces;

producing a third output signal representing the difference between said first and second signals, and applying said third output signal to a sample and hold circuit which produces a fourth output signal.

References Cited

UNITED STATES PATENTS

| | | | |
|---|---|---|---|
| 2,680,376 | 6/1954 | Shaw et al. | 73—407 XR |
| 2,692,501 | 10/1954 | Erwood | 73—407 XR |
| 3,238,959 | 3/1966 | Bowles | 137—81.5 |

FOREIGN PATENTS

| | | |
|---|---|---|
| 832,802 | 4/1960 | Great Britain. |
| 926,621 | 5/1963 | Great Britain. |

LOUIS R. PRINCE, Primary Examiner

W. A. HENRY II, Assistant Examiner